US009683679B2

(12) United States Patent
Karsten

(10) Patent No.: US 9,683,679 B2
(45) Date of Patent: Jun. 20, 2017

(54) METHOD FOR LAYING A PIPELINE

(71) Applicant: J.F. Karsten Beheer B.V., Middelie (NL)

(72) Inventor: Johannes Franciscus Karsten, Middelie (NL)

(73) Assignee: J.F. Karsten Beheer B.V., Middelie (NL)

( * ) Notice: Subject to any disclaimer, the term of this patent is extended or adjusted under 35 U.S.C. 154(b) by 0 days.

(21) Appl. No.: 14/414,763

(22) PCT Filed: Jul. 19, 2013

(86) PCT No.: PCT/NL2013/050547
§ 371 (c)(1),
(2) Date: Jan. 14, 2015

(87) PCT Pub. No.: WO2014/014354
PCT Pub. Date: Jan. 23, 2014

(65) Prior Publication Data
US 2015/0192221 A1 Jul. 9, 2015

Related U.S. Application Data

(60) Provisional application No. 61/673,779, filed on Jul. 20, 2012.

(30) Foreign Application Priority Data

Jul. 20, 2012 (NL) ...................................... 2009214

(51) Int. Cl.
*F16L 1/028* (2006.01)
*E02D 5/28* (2006.01)
(Continued)

(52) U.S. Cl.
CPC .............. *F16L 1/028* (2013.01); *E02D 5/285* (2013.01); *F16L 1/036* (2013.01); *F16L 1/09* (2013.01); *F16L 1/10* (2013.01)

(58) Field of Classification Search
CPC ... F16L 1/028; F16L 1/036; F16L 1/09; F16L 1/10
(Continued)

(56) References Cited

U.S. PATENT DOCUMENTS 3,606,757 A * 9/1971 Weese et al. ........... E02D 17/08
405/283
3,789,614 A 2/1974 Rogers
(Continued)

FOREIGN PATENT DOCUMENTS

DE 10 2010 035990 A1 3/2012
GB 786 012 A 11/1957
WO 2011/102722 A 5/2011

OTHER PUBLICATIONS

International Search Report, dated Jun. 3, 2014, from corresponding PCT application.

*Primary Examiner* — Benjamin Fiorello
(74) *Attorney, Agent, or Firm* — NLO N.V.; Catherine A. Shultz; Minerva Rivero

(57) ABSTRACT

A method for pipe laying, includes the step of vertically forcing a generally rigid pipe section in a substantially vertical direction downwards from a position above ground towards a desired pipe section position in the ground, wherein the pipe section maintains a substantially horizontal position upon forcing the pipe section downwards. The vertically forcing a generally rigid pipe section in a substantially vertical direction downwards is beneficial for pipe laying because time consuming digging of a slit is not required anymore.

15 Claims, 9 Drawing Sheets

(51) Int. Cl.
 *F16L 1/036* (2006.01)
 *F16L 1/09* (2006.01)
 *F16L 1/10* (2006.01)

(58) Field of Classification Search
 USPC .................................................. 405/159, 174
 See application file for complete search history.

(56) References Cited

U.S. PATENT DOCUMENTS

| | | | | |
|---|---|---|---|---|
| 3,810,364 | A * | 5/1974 | Johnson | F16L 1/06 138/106 |
| 3,851,492 | A * | 12/1974 | Cannon | B63C 11/34 405/158 |
| 4,102,145 | A * | 7/1978 | van Steveninck | F16L 1/201 405/159 |
| 4,714,379 | A * | 12/1987 | Gilchrist, Jr. | E02F 5/06 405/158 |
| 5,662,432 | A * | 9/1997 | Colter | F16L 1/06 405/154.1 |
| 5,944,452 | A | 8/1999 | Reinert | |
| 2004/0190995 | A1* | 9/2004 | Matsushita | F16L 1/036 405/174 |
| 2011/0211913 | A1* | 9/2011 | Lazzarin | E02F 5/04 405/163 |
| 2012/0183356 | A1* | 7/2012 | Risi | F16L 1/20 405/159 |
| 2013/0142576 | A1 | 6/2013 | Kocher | |

\* cited by examiner

METHOD FOR LAYING A PIPELINE

BACKGROUND

The present invention relates to a method for pipe laying.

Such a method is known from GB786012 which relates to a self-propelled ground-penetrating device for laying pipes. The devices moves horizontally and pulls a string of pipe sections. Operations are relative complex and considerable forces have to be overcome depending on the length of the pipe.

U.S. Pat. No. 3,789,614 relates to earth engineering and more particularly to pipe laying method wherein the pipe is flexed as it is laid in subterranean position by a machine which advances along the path. The soil is loosened for the layer with a pair of vibrating rippers. This method is suitable for flexible pipe and forces applied to the pipe are relative small.

SUMMARY OF THE INVENTION

The invention aims to provide a faster method of laying a pipe having rigid pipe sections.

Another object of the invention is to improve a method of pile laying wherein at least a problem associated with known methods is partly solved.

Yet another object of the invention is to provide an alternative method of pipe laying.

According to a first aspect of the invention this is realized with a method for pipe laying, comprising the step;
  vertically forcing a generally rigid pipe section in a substantially vertical direction downwards from a position above ground towards a desired pipe section position in the ground, wherein the pipe section maintains a substantially horizontal position upon forcing the pipe section downwards.

The vertically forcing a generally rigid pipe section in a substantially vertical direction downwards is beneficial for pipe laying because time consuming digging of a slit is not required anymore. This results in a faster laying of the pipeline. Forcing here means that the pipe section is moved through the ground wherein ground is displaced which ground displacement requires a considerable force to be overcome depending on the dimensions of the pipe section. The length of such a pipe section is usually 12 meters. Other lengths are conceivable. The method relates in general to rigid pipes of considerable diameter like from 200 to 2100 mm.

In an embodiment of the method, the pipe section maintains a slightly sloped position in the range of −45° to 45° relative to the horizontal upon forcing the pipe section downwards. This reduces, if desired, the required force for forcing the pipe section downwards.

In an embodiment, the method comprises the steps;
  providing a pressing device for vertically forcing the pipe section in the ground,
  providing a ground anchoring member set in the ground and coupled with the pressing device for holding the pressing device.

This allows forcing the pipe section downwards using a high force because the ground anchor member provides a fixed point for the pressing device. The ground anchor member may be a mechanical ground anchor, like a pivoting ground anchor which is known per se.

The ground anchor member may be a mechanical ground anchor pile for supporting the pressing device. This is beneficial since the pile is able to take up tension and pressure and thus also is able to support the pressing device and/or the pipe section itself. In connection with this ground anchor pile, specific reference is made to application PCT/NL2011/050116 in the name of "Kloosterman Waterbouw" which application is published under number WO 2011/102722 and is titled, "Deplogable anchor assembly and method for the fitting thereof". This pile has a pivoting anchoring section which enables re-use of a the pile for laying a subsequent pipe section.

The pressing device may include any suitable driving device like a hydraulic cylinder. It will be clear that a desired number of pressing devices are distributed along the length of the pipe section.

It will be clear that if, for whatever reason, required pressing forces are low, the step providing a ground anchor can be left out. The weight of the pressing device shall then suffices to generate pressing forces or ballast needs to be added to the pressing device.

In an embodiment, the method comprises the step;
  fixedly coupling the ground anchoring member with the pipe section for avoiding rise of the pipe section during operation of the pipe.

Such a ground anchoring member is permanently coupled with the pipe section such that the pipe section stays firmly in the desired pipe section position in the ground.

In an embodiment, the method comprises the step;
  removing the ground anchoring member and,
  re-using the removed ground anchoring member for laying a subsequent pipe section.

This beneficial re-use of a ground anchoring member is in particular enabled when using the ground anchor pile specific reference is made to above.

In an embodiment, the method comprises the step;
  providing a fluid flow for fluidizing ground below and/or beside the pipe section.

This reduces, if desired, the required force for forcing the pipe section downwards.

In an embodiment of the method, providing a ground anchoring member set in the ground comprises providing ground anchoring members at both opposite longitudinal sides of the pipe section.

In an embodiment of the method, the vertically forcing a pipe section in the ground in a vertical direction comprises vibration of the pipe section. This reduces, if desired, the required force for forcing the pipe section downwards.

In an embodiment of the method, the pressing device comprises a thrust block which extends along the pipe wall of the pipe section and contacts the pipe wall to distribute pressure while vertically forcing the pipe section in the ground. The distribution of pressure is important for thin walled pipe sections, in particular for large diameter pipe sections.

In an embodiment of the method, the pressing device comprises a leading ground displacement member arranged below the pipe section, which member extends in the longitudinal direction of the pipe section and contacts the pipe section over substantially the entire length of the pipe section for displacing ground below the pipe section. Such a leading ground displacement member arranged below the pipe section even more reduces the required force for forcing the pipe section downwards. It is of course conceivable to apply the leading ground displacement member at selected parts of the pipe section. The leading ground displacement member is coupled with the pipe section in any suitable manner. Usually, the leading ground displacement member will be designed as a lost part and stays permanently with the pipe section.

In an embodiment, the method comprises the step;
  arranging a guide plate, preferably a pair of opposing guide plates, below the pipe section before forcing the pipe section downwards, for guiding the pipe wall of the pipe section while vertically forcing the pipe section in the ground.

This reduces, if desired, the required force for forcing the pipe section downwards and protects the pipe wall of the pipe section, in particular any possible coating applied to the pipe wall of the pipe section. In addition, the guide plates initiate a horizontal ground movement and therefore make the method more suitable for relative hard ground layers.

In an embodiment, the method comprises the step;
vertically forcing a number of subsequent pipe section in a vertical direction from a position above ground towards a respective desired pipe section position in the ground;
mutually coupling the number of subsequent pipe sections for forming a pipeline.

This results in a pipeline ready for operation. The pipe section are mutually coupled in any suitable manner, usually welding of bolting. It will be clear that the above two steps may be performed in arbitrary order.

The method according to the invention is not necessarily restricted to the laying of new pipe lines. The method may also be applied with benefit to already laid pipelines that need maintenance because the pipeline, or a section thereof, has come up.

According to a further aspect of the invention this is realized with a pipe laying system for use in the method according to the invention, wherein the system comprises;
a pressing device for vertically forcing the pipe section in the ground,
ground anchoring member for setting in the ground and coupled with the pressing device for holding the pressing device.

In an embodiment of the pipe laying system, the pressing device comprises;
a thrust block which extends in the longitudinal direction of the pipe section and contacts the pipe section over substantially the entire length of the pipe section for vertically forcing the pipe section in the ground,
a leading ground displacement member arranged below the pipe section, which member extends in the longitudinal direction of the pipe section and contacts the pipe section over substantially the entire length of the pipe section for displacing ground below the pipe section.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to an preferred embodiment shown in the drawing wherein shown in.

DETAILED DESCRIPTION OF EMBODIMENTS

The method for laying a pipeline is now described referring to all FIG. 1-7.

Figure 1:
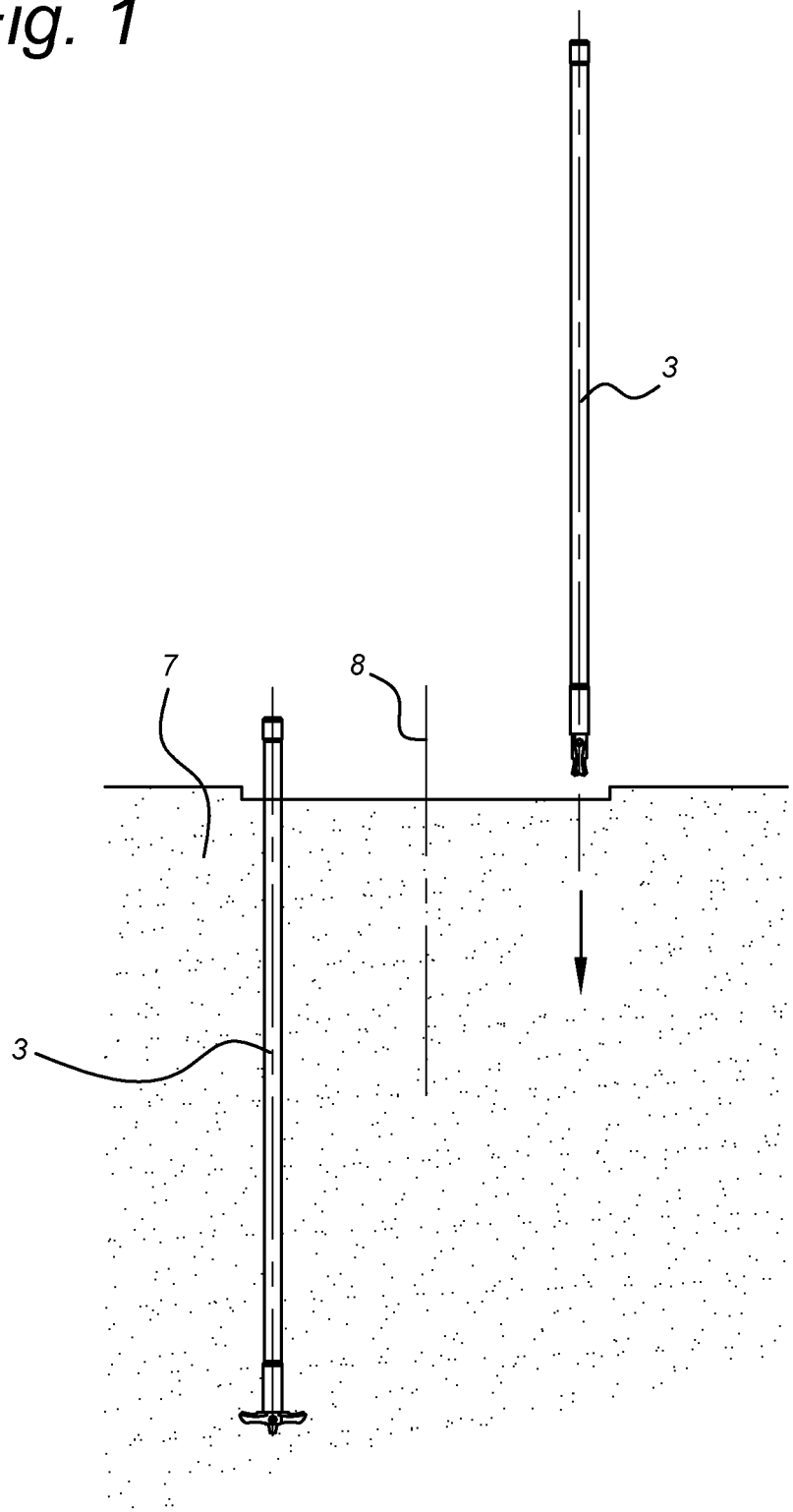
FIG. 1-8 in side view steps during executing the method according to the invention.

In FIG. 1 a ground anchoring member is show set in the ground 7 in a vertical position. Here, the ground anchoring member is a mechanical ground anchor pile 3 for supporting the pressing device 2. A different position for the anchor pile 3 is conceivable as long as the pressing device is supported and a fixed point is provided for forcing the pipe section 1 down. Here, two ground anchoring members are shown set in the ground at both opposite longitudinal sides of the pipe section 1 and centered with the central vertical axis 8. It is possible to remove the shown ground anchoring pile 4 and, re-using the removed ground anchoring pile 4 for laying a subsequent pipe section 1.

Figure 2:
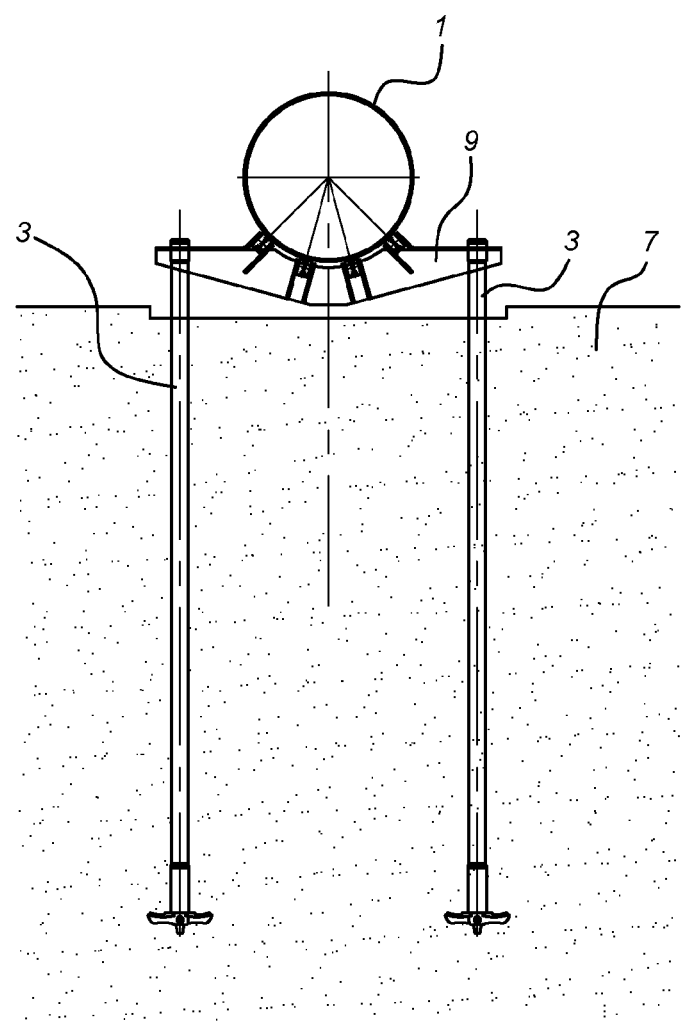

FIG. 2 shows a pipe support frame 9. This frame 9 temporarily supports the pipe section 1 and is supported by the two opposite anchor piles 3. The pipe section 1 is supported in its position above ground 7.

Figure 3:
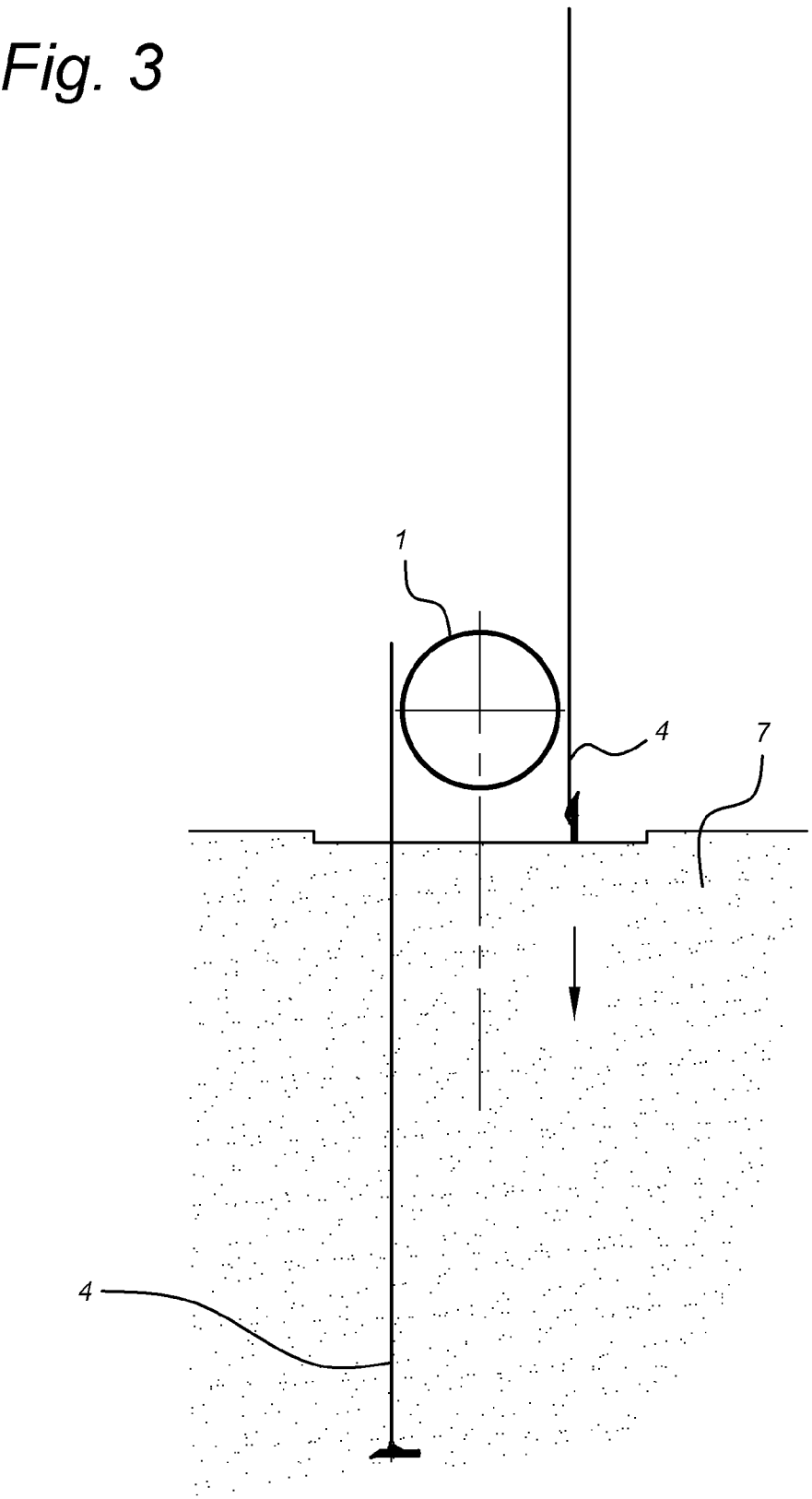
Figure 4:
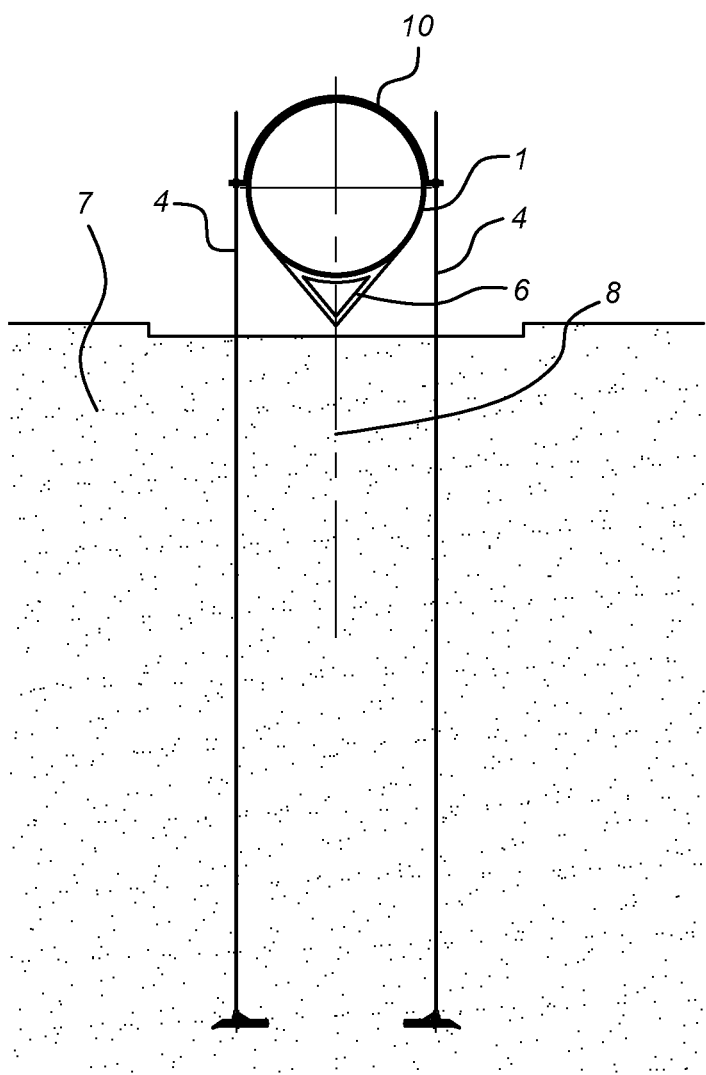

FIG. 3-4 shows a ground anchoring member 4 which is a mechanical ground anchor, here a pivoting ground anchor, provided with a tension cable. This ground anchor may alternatively or additionally (FIG. 6) be provided. It is additionally provided for avoiding rise of the pipe section 1 during operation of the pipeline. The opposite ground anchoring members 4 are then coupled with a pipe enclosing member 10 for coupling the pipe section with the opposite ground anchoring members 4. When the ground anchoring member 4 is alternatively provided, other suitable means (not shown) for supporting the pressing device 1 and/or pipe section 1 is required because the ground anchoring members 4 is only able to take up tension.

In FIG. 4 a leading ground displacement member 6 is shown which member is arranged below the pipe section 1. The ground displacement member 6 extends in the longitudinal direction of the pipe section 1 and contacts the pipe section over substantially the entire length of the pipe section for displacing ground below the pipe section during forcing down of the pipe section 1.

Figure 5:
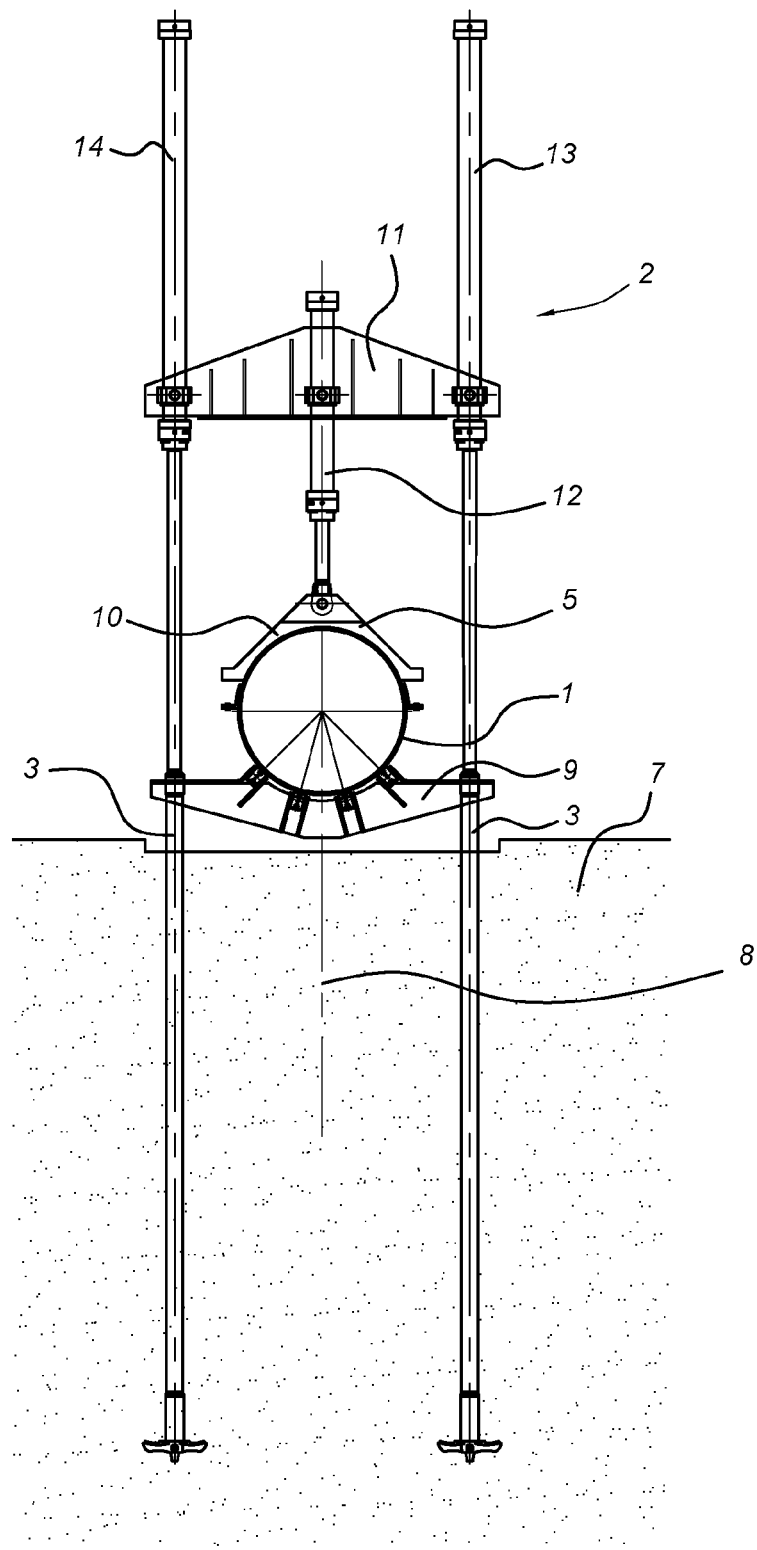
Figure 6:
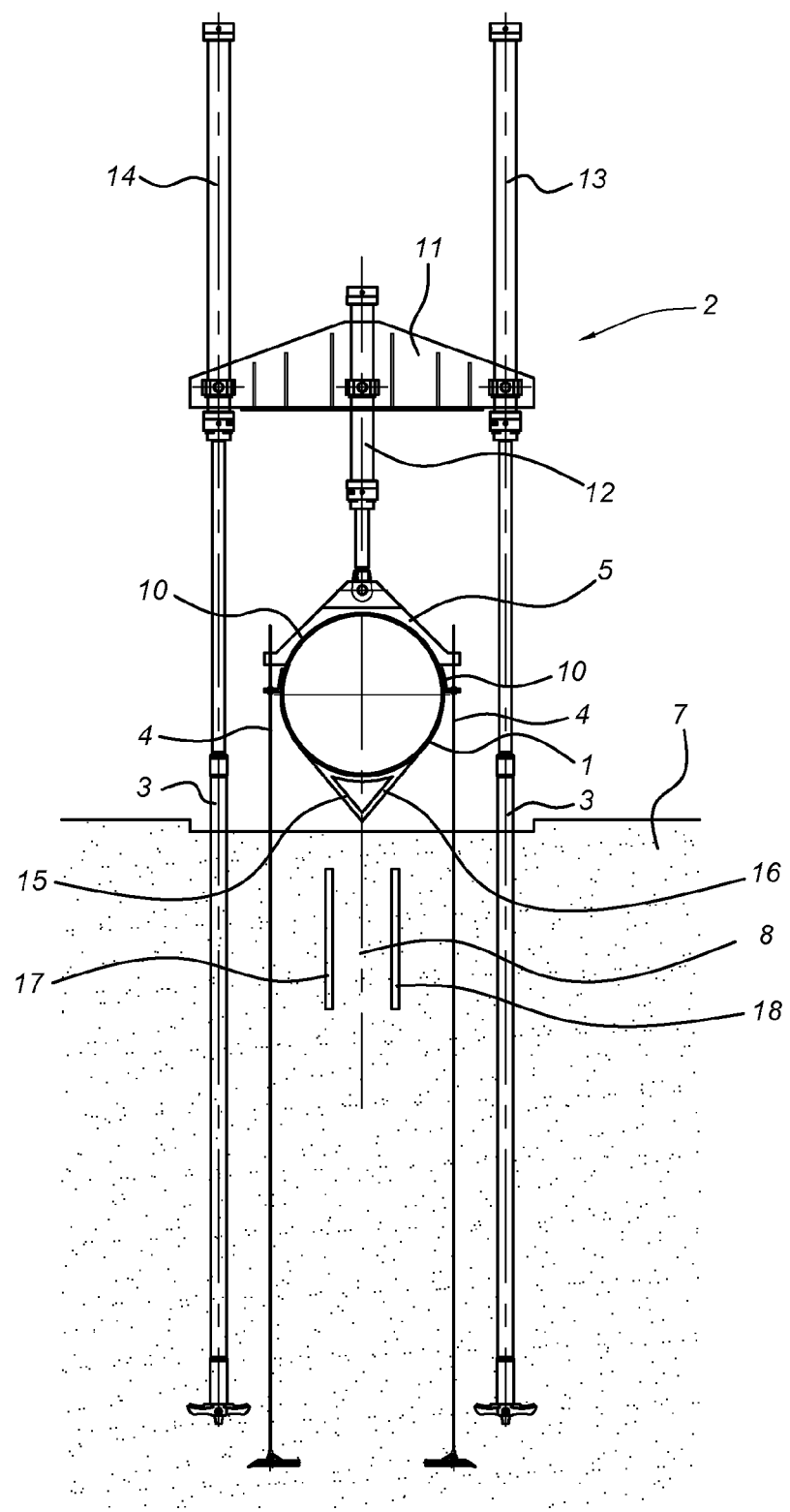
Figure 7:
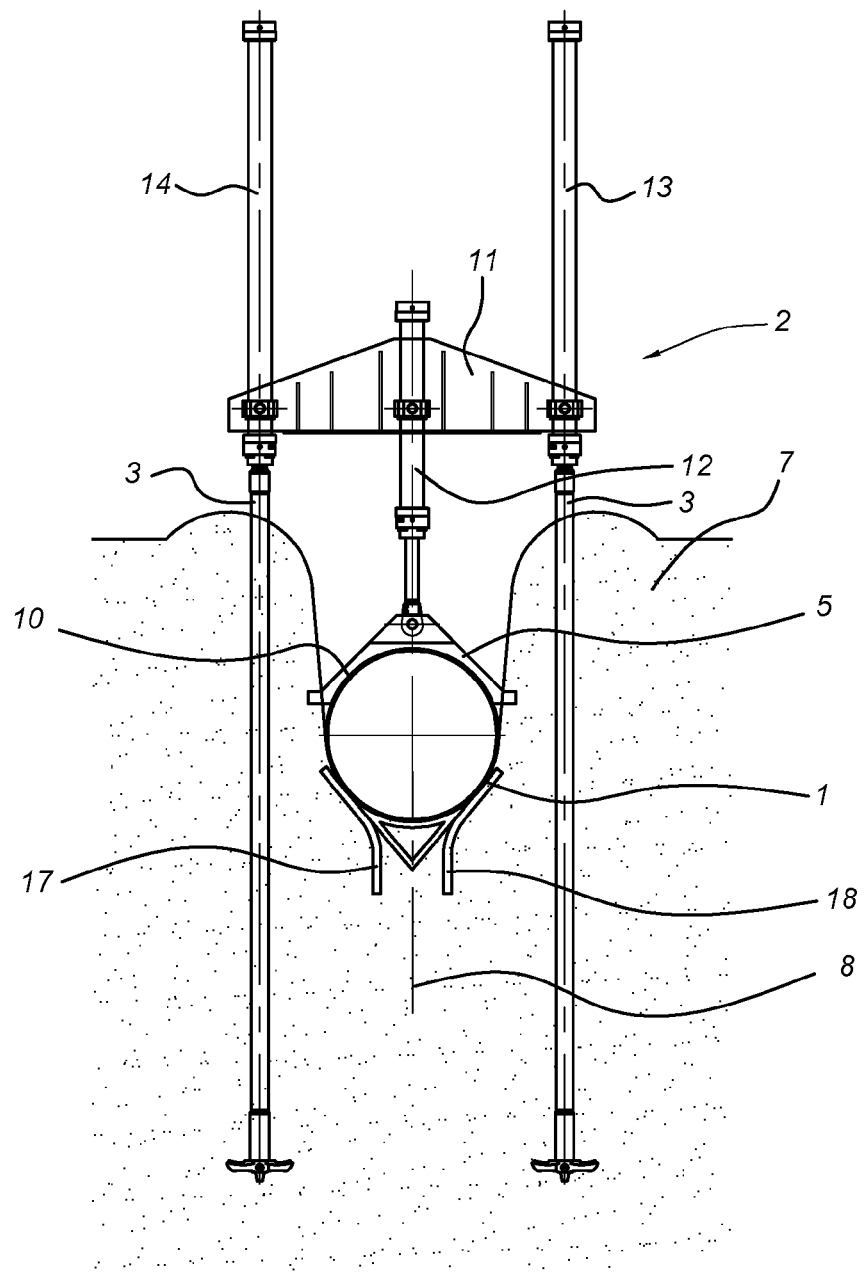

In FIG. 5-7 the pressing device 2 is shown which device here comprise three hydraulic cylinders for forcing the pipe section 1 in the ground. It will be clear that where a single pressing device 2 is shown here, a desired number of pressing devices may be distributed along the length of the pipe section 1. A central hydraulic cylinder 12 is aligned with the central axis 8 and engages the pipe section 1. The central hydraulic cylinder 12 engages the pile section 1 via a pressing device like a thrust block 5 or pressing plate. The thrust block 4 extends along the pipe wall of the pipe section 1 and contacts the pipe wall to distribute pressure while vertically forcing the pipe section in the ground. The thrust block 5 is hingeably coupled with the central hydraulic cylinder 12 which enables sliding off of ground upon retracting the central hydraulic cylinder 12 after the pipe section is delivered in its desired pipe section position. The central hydraulic cylinder 12 is mounted on a drive frame 11. The drive frame 11 is coupled with the two opposite anchor piles 3 via opposite hydraulic cylinders 13, 14 which each extend in line with an anchor pile 3. Of course other configurations for the driving device 2 are conceivable.

In FIG. 6-7, a pair of opposing guide plates 17, 18 is shown which is arranged below the pipe section 1 before forcing the pipe section downwards. The guide plates are made of any suitable material, like steel or plastic, and flexible for guiding the pipe wall of the pipe section 1 while vertically forcing the pipe section in the ground. The guide plates 17, 18 promote transport of ground in a horizontal direction and facilitate delivery of the pipe section in its desired pipe section position. In addition the guide plates 17, 18 protect a possible coating on the pipe wall of the pipe section 1. FIG. 6 shows the plates 17, 18 before delivery of the pipe section 1. A different placement of the plates 17, 18 is conceivable wherein the plates extend partly above the ground. In FIG. 7 the plates 17, 18 are shown in a flexed shape after delivery of the pipe section 1I in its desired pipe section position. During forcing down of the pipe section the plates 17, 18 may engage of the leading ground displacement member 6, in particular the faces 15, 16 thereof, arranged below the pipe section 1. The plates 17, 18 extend in the longitudinal direction of the pipe section 1 over substantially the entire length of the pipe section or parts thereof.

Figure 8:
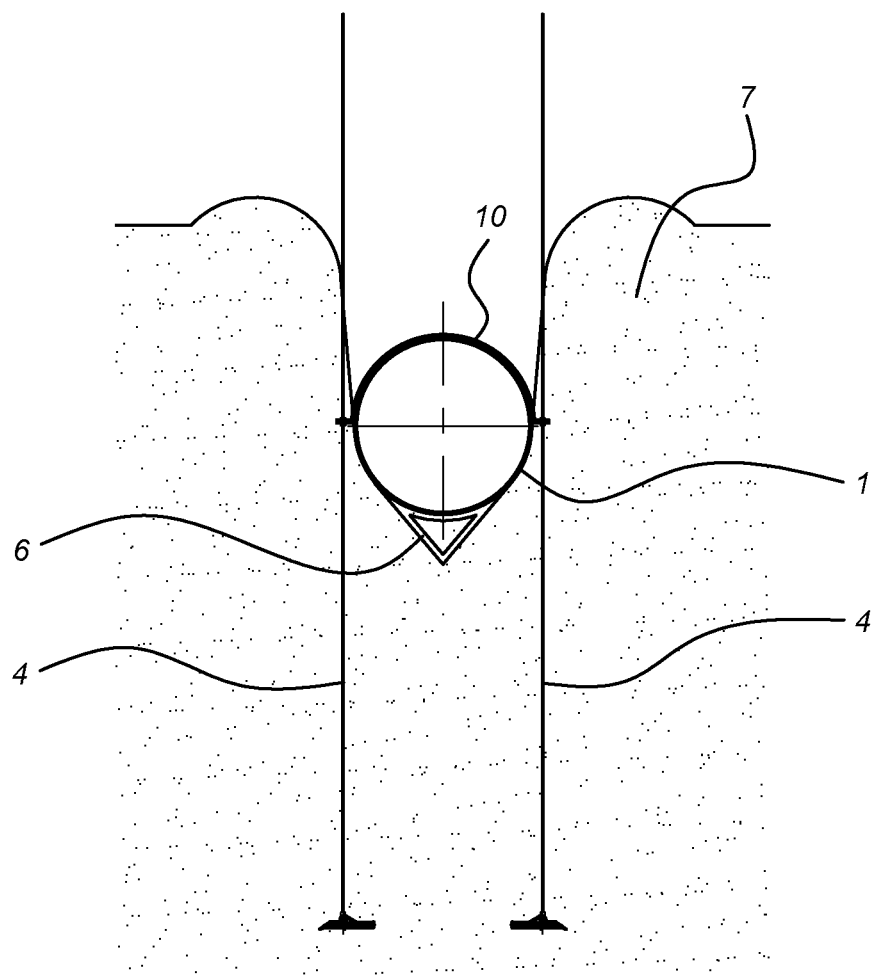

FIG. 7-8 show the pipe section in its desired pipe section position in the ground after the rigid pipe section 1 has been vertically forced down in a substantially vertical direction downwards from a position above ground 7. The pipe section 1 maintains a horizontal position in its desired pipe section position. It will be understood that the position of the pipe section 1 in its desired pipe section position may be parallel with the ground surface which is not necessarily horizontal, or may be slightly sloped to accommodate differences in level.

FIG. 8 shows ground anchoring member 4 provided for avoiding rise of the pipe section 1 during operation of the pipeline. The opposite ground anchoring members 4 are then coupled with a pipe enclosing member 10 for coupling the pipe section with the opposite ground anchoring members 4.

It will be understood that for laying a pipeline, a number of subsequent pipe section 1 are laid and mutually coupled for forming a pipeline.

EXAMPLE

Figure 9:
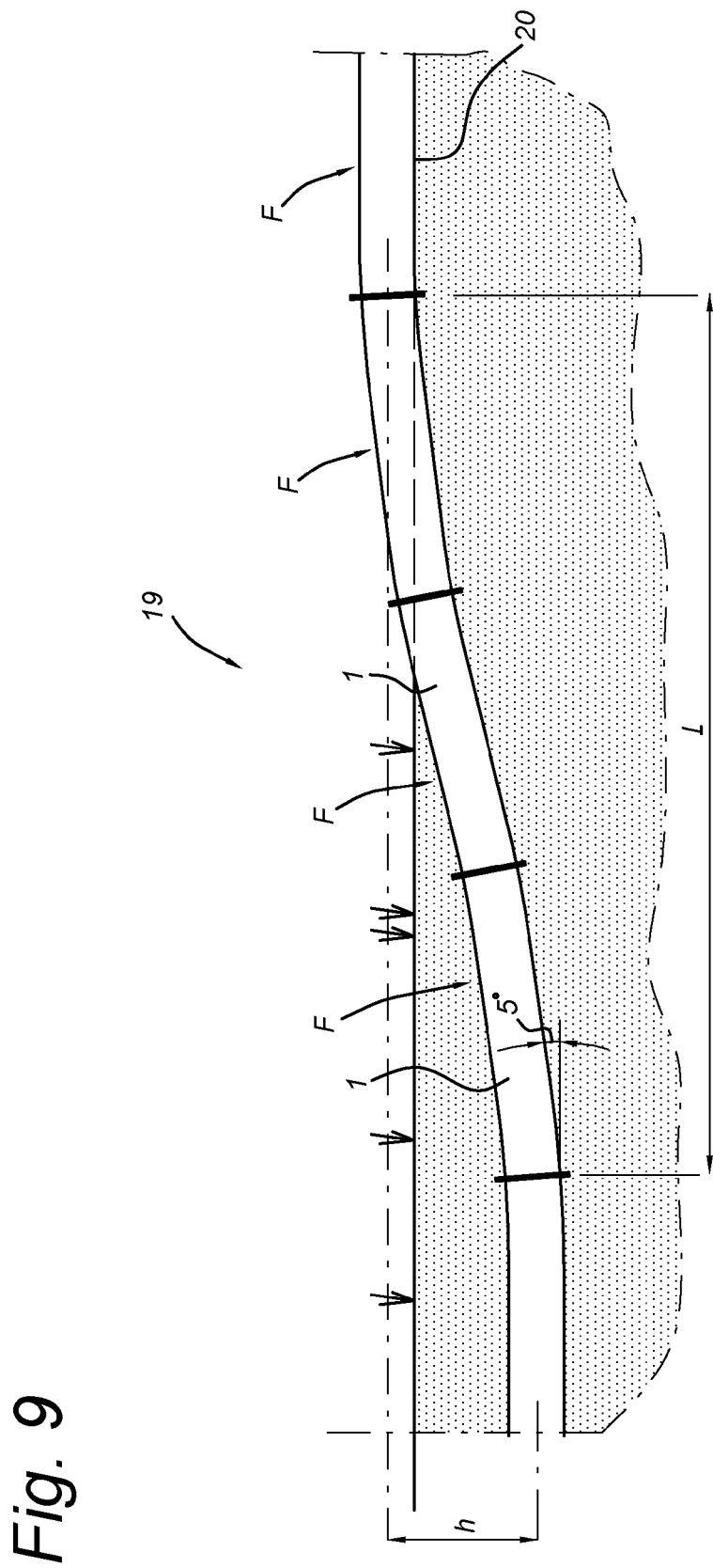
FIG. 9 a side view of a pipeline during forcing into the ground.

As an example the method according to the invention may be beneficially applied during pipe laying as shown in FIG. 9. Pipe segments 1 make up a pipeline 19 having a considerable length of e.g. about 3 km or more. The pipes segments are joined together to form the pipeline 19. The pipeline 19 is maneuvered above ground surface 20 towards the desired location of the pipeline. Subsequently, the entire pipeline 19 is forced into the ground in a stepwise manner. Stepwise means that starting from one end (left end in FIG. 9) of the pipeline, a pipeline part with a length L of about 60 meters is forced into the ground while taking a slightly sloped position of about 5° relative to the horizontal. When the one end reaches its desired depth, the process moves on towards the adjacent pipeline part, in FIG. 9 towards the right. Over the length L the pipeline 19 sinks a distance h into the ground of about 4 meters. Thus, the process of forcing the generally rigid pipe section 1 in a substantially vertical direction downwards from a position above ground towards a desired pipe section position in the ground moves gradually along the pipeline 19. As an option the pipeline 19 may be filled with water to add weight and facilitate the forcing into the ground. Since the pipeline 19 is forced into the ground in assembled form, the joining of the pipe segments 1 may be performed elsewhere which enables to provide better conditions for joining processes like welding.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A method for pipe laying, comprising:
providing a pressing device for vertically forcing the pipe section in the ground,
vertically forcing a generally rigid pipe section with the pressing device in a substantially vertical direction downwards from a position above ground towards a desired pipe section position in the ground thereby displacing ground, wherein the pipe section maintains a substantially horizontal position upon forcing the pipe section downwards,
providing a ground anchoring member set in the ground providing a fixed point in the ground, and coupled with the pressing device for holding the pressing device.

2. The method according to claim 1, wherein the pipe section maintains a slightly sloped position in the range of −45° to 45° relative to the horizontal upon forcing the pipe section downwards.

3. The method according to claim 1, where the ground anchoring member is a mechanical ground anchor.

4. The method according to claim 3, wherein the ground anchoring member is a mechanical ground anchor pile (3) for supporting the pressing device.

5. The method according to claim 1, further comprising:
fixedly coupling the ground anchoring member (4) with the pipe section for avoiding rise of the pipe section during operation of the pipe.

6. The method according to claim 1, further comprising the step:
removing the ground anchoring member (4) and,
re-using the removed ground anchoring member (4) for laying a subsequent pipe section.

7. The method according to claim 1, further comprising:
providing a fluid flow for fluidizing ground below and/or beside the pipe section.

8. The method according to claim 1, wherein providing a ground anchoring member set in the ground comprises providing ground anchoring members at both opposite longitudinal sides of the pipe section.

9. The method according to claim 1, wherein the vertically forcing a pipe section in the ground in a vertical direction comprises vibration of the pipe section.

10. The method according to claim 1, wherein the pressing device comprises a thrust block which extends along the pipe wall of the pipe section and contacts the pipe wall to distribute pressure while vertically forcing the pipe section in the ground.

11. The method according to claim 1, wherein the pressing device comprises a leading ground displacement member arranged below the pipe section, which member extends in the longitudinal direction of the pipe section and contacts the pipe section over substantially the entire length of the pipe section for displacing ground below the pipe section.

12. The method according to claim 1, further comprising:
arranging a guide plate below the pipe section before forcing the pipe section downwards, for guiding the pipe wall of the pipe section while vertically forcing the pipe section in the ground.

13. The method according to claim 12, wherein the guide plate comprises a pair of opposing guide plates.

14. The method according to claim 1, further comprising:
vertically forcing a number of subsequent pipe section in a vertical direction from a position above ground towards a respective desired pipe section position in the ground;
mutually coupling the number of subsequent pipe sections for forming a pipeline.

15. A pipe laying system, wherein the system comprises:
a pressing device for vertically forcing the pipe section in the ground in a substantially vertical direction downwards from a position in or above ground towards a desired pipe section position in the ground, a ground anchoring member for setting in the ground providing a fixed point in the ground and coupled with the pressing device for holding the pressing device.

* * * * *